United States Patent
Kanazawa et al.

(10) Patent No.: US 11,412,799 B2
(45) Date of Patent: Aug. 16, 2022

(54) BUTTON ATTACHMENT MEMBER CONVEYING DEVICE

(71) Applicant: YKK Corporation, Tokyo (JP)

(72) Inventors: Hiroaki Kanazawa, Toyama (JP); Ryusaku Watanabe, Toyama (JP)

(73) Assignee: YKK Corporation, Tokyo (JP)

( * ) Notice: Subject to any disclaimer, the term of this patent is extended or adjusted under 35 U.S.C. 154(b) by 490 days.

(21) Appl. No.: 16/607,999

(22) PCT Filed: Apr. 28, 2017

(86) PCT No.: PCT/JP2017/017049
§ 371 (c)(1),
(2) Date: Oct. 24, 2019

(87) PCT Pub. No.: WO2018/198358
PCT Pub. Date: Nov. 1, 2018

(65) Prior Publication Data
US 2021/0045482 A1     Feb. 18, 2021

(51) Int. Cl.
*B65G 47/24*    (2006.01)
*B65G 47/74*    (2006.01)
(Continued)

(52) U.S. Cl.
CPC ............. *A41H 37/04* (2013.01); *B65G 47/74* (2013.01); *G01N 27/20* (2013.01); *B65G 2203/042* (2013.01)

(58) Field of Classification Search
CPC .. B65G 47/24; B65G 47/74; B65G 2203/042; A41H 37/04; A41H 37/10; F16B 19/10
(Continued)

(56) References Cited

U.S. PATENT DOCUMENTS 3,288,331 A    11/1966   Mazurkivich
4,019,666 A     4/1977   Foults
(Continued)

FOREIGN PATENT DOCUMENTS

DE    102015013344 A1    4/2017
JP         52-60740 A    5/1977
(Continued)

OTHER PUBLICATIONS

International Preliminary Report on Patentability, PCT Patent Application No. PCT/JP2017/017049, dated Nov. 7, 2019, 6 pages.
(Continued)

*Primary Examiner* — Douglas A Hess
(74) *Attorney, Agent, or Firm* — Kilpatrick Townsend & Stockton LLP

(57) ABSTRACT

A button fastener transfer device can detect a fastener with one or more legs are bent radially outward. The button fastener transfer device includes a transfer path for passing the fastener with the base down; a movable member movable in the transfer path for moving the fastener downstream in the transfer path; a rotation applying part capable of contacting the fastener moving in the transfer path and configured to rotate the fastener in the circumferential direction of the base; at least one first conductive member and at least one second conductive member, which are normally electrically isolated from each other; a detection part configured to detect a non-normal fastener having at least one non-normal leg bent radially outward; and an energization mechanism configured to cause an electric current to flow between the first conductive member and the second conductive member if the detection part detects the non-normal fastener.

9 Claims, 17 Drawing Sheets

(51) Int. Cl.
  *A41H 37/04* (2006.01)
  *A41H 37/10* (2006.01)
  *F16B 19/10* (2006.01)
  *G01N 27/20* (2006.01)

(58) Field of Classification Search
  USPC .................................. 414/749.6; 29/715, 788
  See application file for complete search history.

(56) References Cited

U.S. PATENT DOCUMENTS

| | | | | |
|---|---|---|---|---|
| 4,592,501 | A | * | 6/1986 | Sodeno .................. A41H 37/10 227/119 |
| 4,641,741 | A | * | 2/1987 | Oura ...................... A41H 37/10 198/493 |
| 4,978,046 | A | * | 12/1990 | Hagmann ................ B23Q 7/18 227/4 |
| 5,775,566 | A | * | 7/1998 | Kochs .................... A41H 37/00 227/18 |
| 7,043,812 | B1 | | 5/2006 | Nakajo et al. |
| 9,995,330 | B2 | * | 6/2018 | Tchouangueu .......... F16B 1/005 |
| 10,458,457 | B2 | * | 10/2019 | Babej ..................... F16B 19/10 |

FOREIGN PATENT DOCUMENTS

| | | |
|---|---|---|
| JP | 2004-100086 A | 4/2004 |
| WO | 2014/061140 A1 | 4/2004 |
| WO | 2014/049881 A1 | 4/2014 |

OTHER PUBLICATIONS

International Search Report, PCT Application No. PCT/JP2017/017049, dated Jul. 18, 2017.

* cited by examiner

BUTTON ATTACHMENT MEMBER CONVEYING DEVICE

TECHNICAL FIELD

The present invention relates to a button fastener transfer device, and more specifically to a device to transfer and supply a fastener to a button attachment apparatus, in which a button member such as a female snap or a male snap is attached to a fabric with the fastener.

BACKGROUND ART

A button comprising a button member (also referred to as a snap member) such as a female snap or a male snap and a fastener is widely used in clothes, bags or the like. FIG. 1 is a cross-sectional view showing a state immediately before a female snap 10 is attached to a garment fabric 1 using a metallic fastener 20 having a plurality of legs 22. FIG. 2 is a cross-sectional view showing a state where the female snap 10 is attached to the fabric 1. The female snap 10 is formed such as by drawing a metal plate. The male snap 10 comprises a central tube 11 for receiving and detachably engaging an engaging projection of a male snap (not shown), and a flange 14 extending radially outward from the lower end of central tube 11 (hereinafter in this specification, an up-and-down (vertical) direction is based on FIGS. 1 and 2). The central tube 11 includes an inner bulge 12 folded back radially inward from the upper end, and a plurality of slits 13. The slits 13 are spaced apart at intervals in the circumferential direction of the central tube 11. Each of the slits 13 is formed from the lower end of the inner bulge 12 through the upper end of the central tube 11 to a lower position of the central tube 11. The flange 14 extends upward and radially outward from the lower end of the central tube 11 and then is bent downward and radially inward in a C-shape to terminate. There is formed an annular gap 15 between the distal end 14a of the flange 14 and a flange portion 14b (a proximal end 14b connected to the lower end of the central tube 11 of the flange 14) radially inward relative to the distal end 14a. This gap 15 serves as a leg receiving opening 15 for receiving in the flange 14 the legs 22 of the fastener 20, which have penetrated the fabric 1 in the vertical direction.

The fastener 20 is formed such as by punching or bending a metal plate, and comprises an annular base 21 and, as an example, five legs 22 that continuously rise upward from the radially inner end of the base 21. These legs 22 are arranged in the base 21 at equal intervals in the circumferential direction. The base 21 defines a circular opening 23. Each of the legs 22 extends from the base 21 and gradually narrows to the tip, which is sharp. When the female snap 10 is attached to the fabric 1, generally, the female snap 10 is held by an upper die 111 (see FIG. 3, etc.) and the fastener 20 is set on a lower die 112 (see FIG. 3, etc.) in a button attachment section of a button attachment apparatus with the fabric 1 placed above the fastener 20. After that, the upper die 111 is lowered toward the lower die 112. Thereby, each of the legs 22 of the fastener 20 pierces the fabric 1 upward; then goes into the flange 14 through the leg receiving opening 15 of the female snap 10; and is deformed along the inner surface of the flange 14 as shown in FIG. 2. Thereby, the female snap 10 is fastened to the fabric 1. FIG. 2 shows the female snap 10 properly attached to the fabric 1. Although not shown, the male snap also includes a flange similar to that of the female snap 10. In other words, the male snap includes a flange 14 having a leg receiving opening 15. Thus, the male snap can also be attached to a fabric using the same fastener 20 as for the female snap 10.

FIG. 3 is a cross-sectional view almost similar to FIG. 1 showing a fastener 20 in which one or more of the legs 22 are non-normally bent radially outward relative to the normal position. In FIG. 3, the reference numeral 22a is a leg (non-normal leg) which is non-normally bent radially outward. In a case where a fastener 20 includes the non-normal leg 22a, if the female snap 10 is attached to the fabric 1, the non-normal leg 22a would be bent radially outward as shown in FIG. 4 without going into the flange 14 through the leg receiving opening 15 of the female snap 10 after the non-normal leg 22a has penetrated the fabric 1 upward (or has not penetrated the fabric 1). In this case, if the fabric 1 is, for example, baby clothes, there is a risk of hurting the skin of a baby. Therefore, it is desirable to determine whether the legs 22 of the fastener 20 are normal or not before attaching the button.

WO2014/049881 discloses an example of a determination device to determine whether the legs 22 of the fastener 20 are normal or not. This determination device comprises an inspection jig having, in its bottom, an annular groove for receiving all the legs of the fastener. Then, in a case where the upper inspection jig is lowered relative to the lower fastener, when all the legs of the fastener are normal, all the legs are received in the annular groove. On the other hand, if one or more of the legs are defective because of being bent radially outward or inward, the defective leg(s) does(do) not go into the annular groove, limiting the lowering of the inspection jig. This is sensed by a sensor.

In the above-mentioned determination device, an inspection process is separately added in the middle of a transfer process of the fastener in the button attachment apparatus. Therefore, it is necessary to incorporate the determination device separately from a transfer device into the transfer device of the fastener. Thus, there is a problem that the structure becomes complicated.

CITATION LIST

Patent Literatures

Patent Document 1:WO2014/049881

SUMMARY OF INVENTION

Technical Problem

An object of the present invention is to provide a button fastener transfer device which can detect a fastener in which one or more legs are bent radially outward in a transfer process of the fastener.

Solution to Problem

To solve the above problems, according to one aspect of the present invention, there is provided a button fastener transfer device for transferring a metallic fastener to a button attachment section, in which a button member is to be attached to a fabric with the fastener, the fastener comprising an annular base and a plurality of legs, which extend from the base and are spaced apart in the circumferential direction of the base, the device comprising:

a transfer path for passing the fastener with the base down;

a movable member movable in the transfer path for moving the fastener downstream in the transfer path;

a rotation applying part capable of contacting the fastener moving in the transfer path and configured to rotate the fastener in the circumferential direction of the base;

at least one first conductive member and at least one second conductive member, which are normally electrically isolated from each other;

a detection part configured to detect a non-normal fastener having at least one non-normal leg bent radially outward non-normally; and an energization mechanism configured to cause an electric current to flow between the first conductive member and the second conductive member if the detection part detects the non-normal fastener.

The button fastener transfer device according to the present invention is for transferring and supplying the fastener to the button attachment section in the button attachment apparatus. At the transferring of the fastener, the button fastener transfer device can detect a certain fastener in which at least one leg is bent radially outward non-normally as a defective product, and then stop the transferring of such a non-normal fastener. Therefore, a fastener with its one or more legs bent radially inward non-normally is not a detection object of the button fastener transfer device according to the invention. Hereinafter, in this specification, a leg(s) which is(are) non-normally bent radially outward is(are) also referred to as a "non-normal leg(s)", and a fastener having one or more non-normal legs is also referred to as a "non-normal fastener". In addition, a fastener in which all the legs are not non-normal legs is also referred to as a "normal fastener".

In the invention, the fastener is set in the transfer path with the base down and is moved downstream by being pushed by the movable member. The fastener moving on the transfer path will be rotated by contacting the rotation applying part. By this rotation, it will be possible to bring a non-normal fastener having one or more non-normal legs to a position that is detectable by the detection part. In a case with a normal fastener, the fastener is supplied to the button attachment section without the detection part operating. On the other hand, if the non-normal fastener is rotated by the rotation applying part when passing through the transfer path, the detection part detects the non-normal fastener. Thereby, an electric current flows between the first and second conductive members by the energization mechanism, between which have been electrically isolated until then. Thereby, the supplying of the non-normal fastener to the button attachment section is stopped. The first conductive member is connected to an anode side (or a cathode side) of the power supply, and the second conductive member is connected to a cathode side (or an anode side) of the power supply. As manners of detecting a non-normal fastener by the detection part, the following can be cited. For example, the detection part may detect the non-normal fastener by contacting the non-normal leg(s). Alternatively, the detection part may detect the non-normal fastener by being displaced by contacting the non-normal fastener. However, it is not limited thereto. In the invention, it is possible to determine whether a fastener is good or bad in the transferring process of the fastener by the button fastener transfer device.

In one embodiment of the present invention, the at least one first conductive member includes the detection part, and the at least one second conductive member defines a bottom of the transfer path, wherein the detection part is allowed to contact the non-normal leg of the fastener but not to contact normal legs, and wherein the energization mechanism passes an electric current between the first conductive member and the second conductive member through the non-normal fastener. In this embodiment, the legs of the normal fastener do not contact the detection part, which is a part of the first conductive member, while a non-normal leg(s) of the non-normal fastener contacts the detection part, which is a part of the first conductive member. At this time, the first conductive member including the detection part and the second conductive member defining the bottom of the transfer path on which the non-normal fastener is placed are electrically connected via the metallic (non-normal) fastener, an electrical current flows between the first and second conductive members.

In one embodiment of the present invention, the at least one second conductive member includes the rotation applying part, wherein the detection part includes a first peeling surface for partially peeling a coating of the non-normal leg of the non-normal fastener when the non-normal fastener is coated, and wherein the rotation applying part serves as a second peeling surface for partially peeling a coating of the base of the non-normal fastener. There is a case where the metallic fastener is coated with a nonconductive coating such as painting or the like. When a non-normal fastener with such a nonconductive coating passes through the transfer pass and its non-normal leg(s) contacts the detection part, the coating on the non-normal leg(s) will be partially peeled off by the first peeling surface. Substantially simultaneously with this, when the base of the non-normal fastener contacts the rotation applying part, the coating on the base is partially peeled off by the second peeling surface, which the rotation applying part doubles as. Thereby, an electric current flows between the first conductive member including the detection part and the second conductive member including the rotation applying part via the non-normal fastener. The first and second peeling surfaces can be formed, for example, by processing fine irregularities on the detection part and the rotation applying part.

In one embodiment of the present invention, the rotation applying part is provided on a left side or a right side of the transfer path, and rotates the fastener by friction with the base of the fastener. In this embodiment, when the base of the fastener being transferred downstream on the transfer path by the movable member comes into contact with the rotation applying part provided on the left side or the right side of the transfer path, sort of a brake is applied to the left or right portion of the base which has just contacted the rotation applying part by the friction between the base and the rotation applying part, causing the base, namely the fastener to rotate in the circumferential direction so as to allow the right or left portion of the base which does not contact the rotation applying part to go ahead downstream.

In one embodiment of the present invention, the rotation applying part is biased by an elastic member toward the right side or the left side of the transfer path that the rotation applying part faces. In this case, since the rotation applying part provided on the left or right side of the transfer path is biased by the elastic member toward the opposite right or left side of the transfer path, the rotation applying part will come into contact with the base of the fastener passing through the transfer path so as to push the base toward the opposite side of the transfer path. Thereby, it is possible to rotate the fastener by the rotation applying part contacting the base of the fastener reliably.

In another embodiment of the present invention, the detection part is allowed to be displaced by contact with the non-normal fastener and is allowed to contact the first conductive member in the displaced state, wherein the detection part is conductive, wherein the energization mechanism causes an electric current to flow between the first conductive member and the second conductive member via the detection part. In this embodiment, the normal fastener does not contact the detection part; or even if the normal fastener contacts the detection part, this will never displace the detection part to be in contact with the first conductive member. The non-normal fastener contacts the detection part, displacing the detection part to be in contact with the first conductive member. At this time, the first conductive member and the second conductive member are electrically connected via the conductive detection part, and an electric current flows between the first and second conductive members.

In another embodiment of the present invention, the second conductive member is a base body defining a bottom of the transfer path, and the detection part is displaceably placed on the base body. In this case, the non-normal fastener displaces the detection part on the base body to be in contact with the first conductive member and, at this time, an electric current flows between the first conductive member and the base body as the second conductive member via the detection part.

In another embodiment of the present invention, the rotation applying part is provided on a left side or a right side of the transfer path, and has a grooved surface in which a plurality of vertical grooves are arranged at predetermined intervals from the upstream side to the downstream side in the transfer path, and wherein the rotation applying part is configured to rotate the fastener by receiving at least one of the legs of the fastener in at least one of the grooves. In this case, at least one of the legs of the fastener moving downstream in the transfer path comes into one of the plurality of the vertical grooves, provided on the left or right side of the transfer path, in the grooved surface of the rotation applying part. That is, by a leg(s) being caught in a vertical groove(s), sort of a brake is applied to the left or right side of the fastener, on which side the rotation applying part is provided, causing the fastener to circumferentially rotate. The interval (predetermined interval) between two vertical grooves adjacent in the upstream-downstream direction in the grooved surface of the rotation applying part may be set to be the same as the circumferential interval between two legs adjacent in the circumferential direction of the base of the fastener, but not limited thereto. Further, one vertical groove may be sized to be able to receive one leg of the fastener, but not limited thereto. For example, it is possible to design one vertical groove to receive two legs.

In another embodiment of the present invention, the detection part defines a part of the right side or the left side of the transfer path that is opposite to the rotation applying part, and wherein the detection part is biased by an elastic member to an initial position which is closest to the rotation applying part, and is allowed to be displaced so as to move away from the rotation applying part from the initial position against the bias of the elastic member by contact with the non-normal fastener. In this embodiment, the detection part that defines the side, of the transfer path, opposite to the rotation applying part is located closest to the rotation applying part in the initial position, in which the detection part is biased by the elastic member. In a case where the normal fastener passes through the transfer path, even if at least one of its legs comes in one of the vertical grooves of the rotation applying part to rotate the normal fastener, the detection part is not displaced from the initial position; or even though the detection part is slightly displaced, the detection part does not contact the first conductive member. On the other hand, if the non-normal fastener passes through the transfer path, the detection part can contact the first conductive member by the following two manners. That is, i) if a normal leg of the non-normal fastener comes in one of the vertical grooves of the rotation applying part, the fastener will rotate and thereby a non-normal leg of the fastener will directly contact the detection part. Thereby, the detection part will be displaced from the initial position against the bias of the elastic member to come into contact with the first conductive member (see FIG. 15). In addition, ii) if at least one non-normal leg of the non-normal fastener comes in one of the vertical grooves of the rotation applying part, at this time, the base of fastener is displaced toward the detection part that is on the side opposite to the rotation applying part, more than the case where the normal leg comes in one of the vertical grooves of the rotation applying part (see FIG. 17). Thereby, the non-normal fastener displaces the detection part from the initial position away from the rotation applying part against the bias of the elastic member, causing the detection part to come into contact with the first conductive member.

Advantageous Effect of Invention

In the button fastener transfer device according to the present invention, the fastener moving on the transfer path contacts the rotation applying part and then rotates. By this rotation, the non-normal fastener having one or more non-normal legs comes into contact with the detection part, and thereby the energization mechanism operates to energize between the first conductive member and the second conductive member, which have been electrically isolated till then. In a case of the normal fastener, it is designed as follows. When the normal fastener rotates by contacting the rotation applying part, the fastener does not contact the detection part, or even if it contacts, this will not cause the energization mechanism to operate. In this way, it is possible to determine whether a fastener is good or bad in the transferring process of the fastener by the button fastener transfer device.

DESCRIPTION OF EMBODIMENTS

Figure 2:
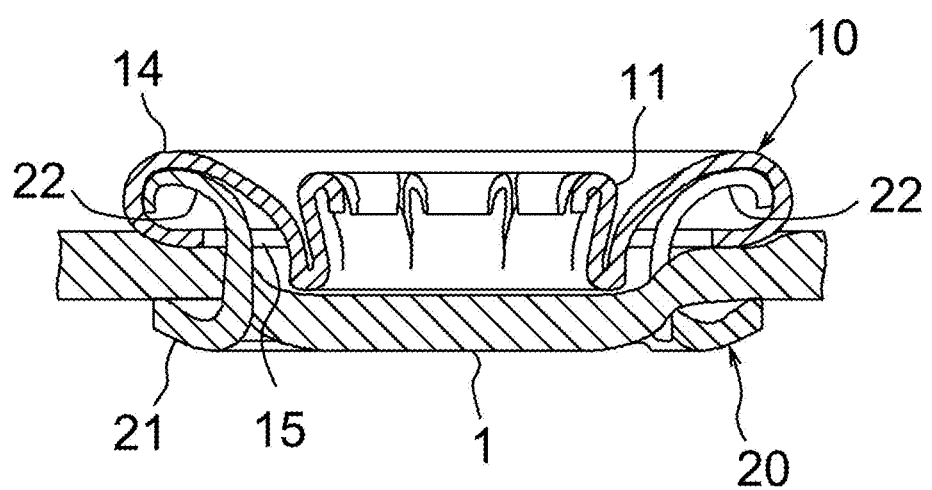
FIG. 2 is a cross-sectional view showing a state where the female snap and the fastener are attached to the fabric.
Figure 5:
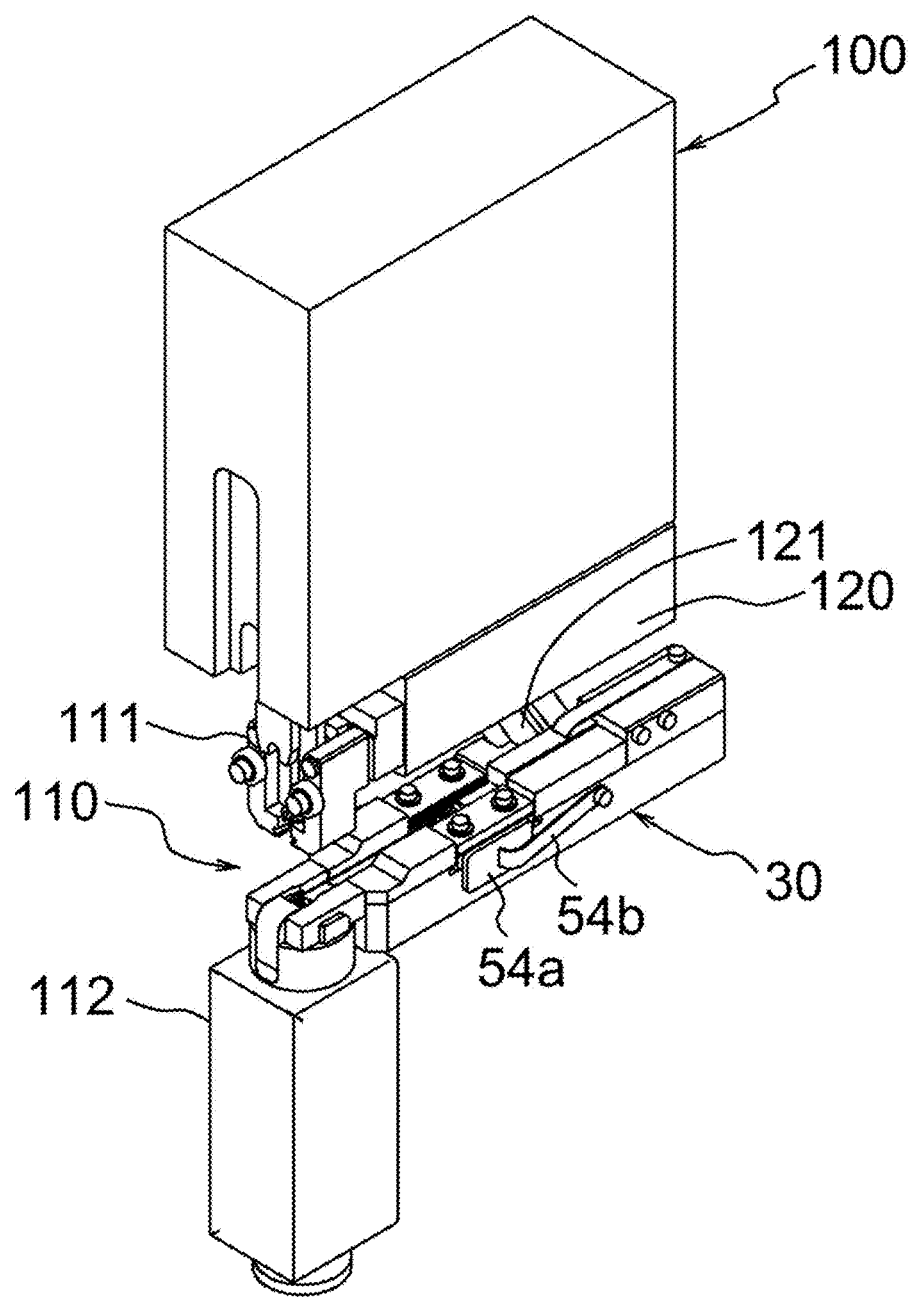
FIG. 5 is a perspective view schematically showing a button attachment apparatus, into which the button fastener transfer device according to the present invention is incorporated.

Hereinafter, embodiments of the present invention is described based on the drawings, but the invention is not limited to such embodiments, and can be suitably altered within the scope of the claims and the range of equivalents. FIG. 5 is a perspective view schematically showing a button attachment apparatus 100, into which a button fastener transfer device (hereinafter, also simply referred to as a "transfer device") 30 according to the present invention is incorporated. The button attachment apparatus 100 comprises a button attachment section 110 for continuously attaching a female snap 10 or a male snap as a button member to a fabric 1 with the fastener 20. In the following, the button attachment apparatus 100 will be described as one for attaching the female snap 10 to the fabric 1, but the male snap can also be attached to the fabric in the same manner as the female snap 10. The button attachment section 110 comprising an upper die 111 and a lower die 112. When the female snap 10 is attached to the fabric 1 using the fastener 20, the female snap 10 is held by the upper die 111 and the fastener 20 is set on the lower die 112, with the fabric is placed above the fastener 20. Then, the upper die 111 is lowered toward the lower die 112. Thereby, the legs 22 of the fastener 20 penetrates the fabric 1 upward, and then are deformed within the flange 14 of the female snap 10. Thereby, the female snap 10 is fastened to the fabric 1 (see FIG. 2).

Figure 3:
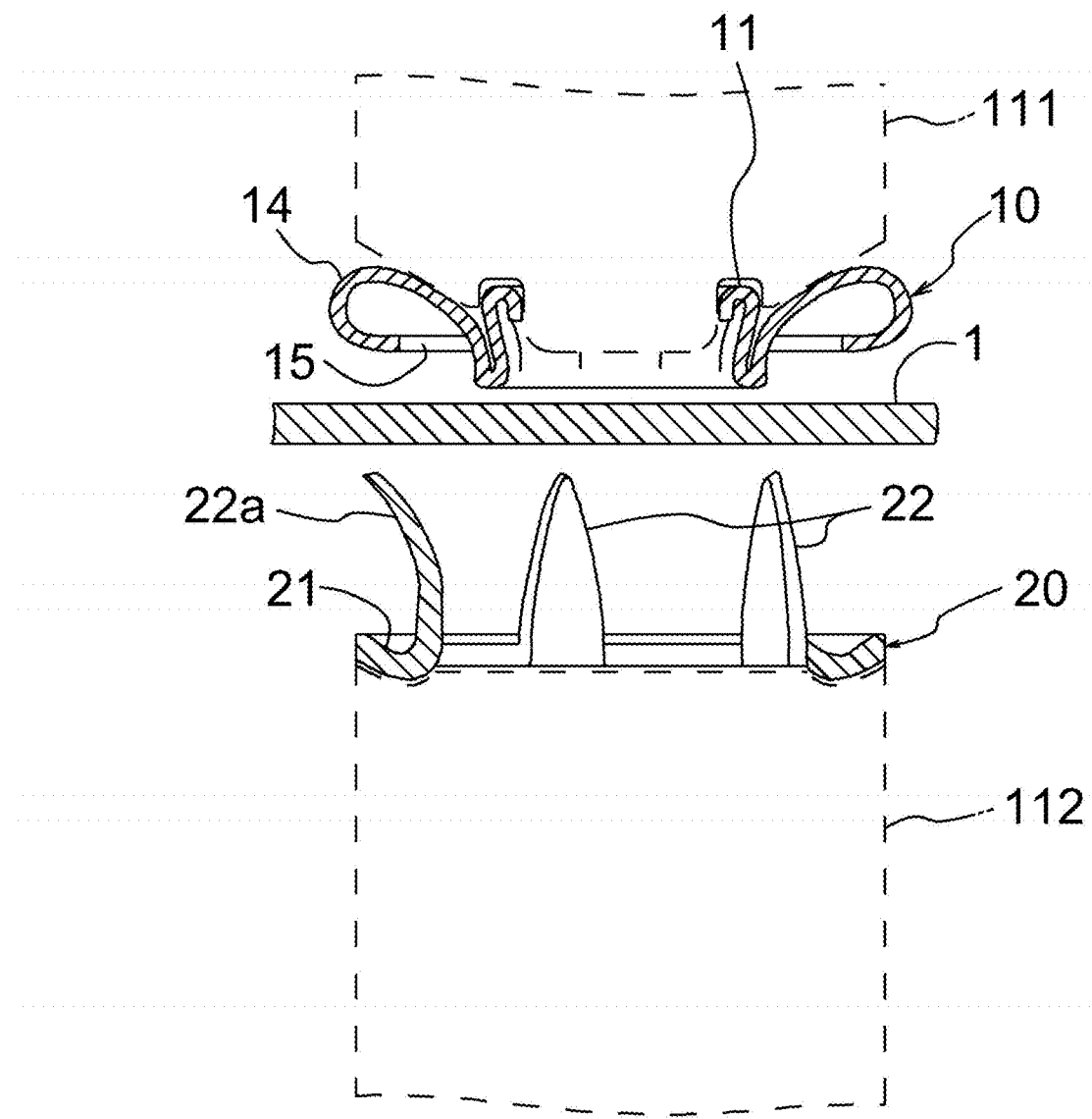
FIG. 3 is a cross-sectional view similar to FIG. 1 showing a state immediately before the female snap is attached to the fabric with an non-normal fastener having one or more non-normal legs.
Figure 4:
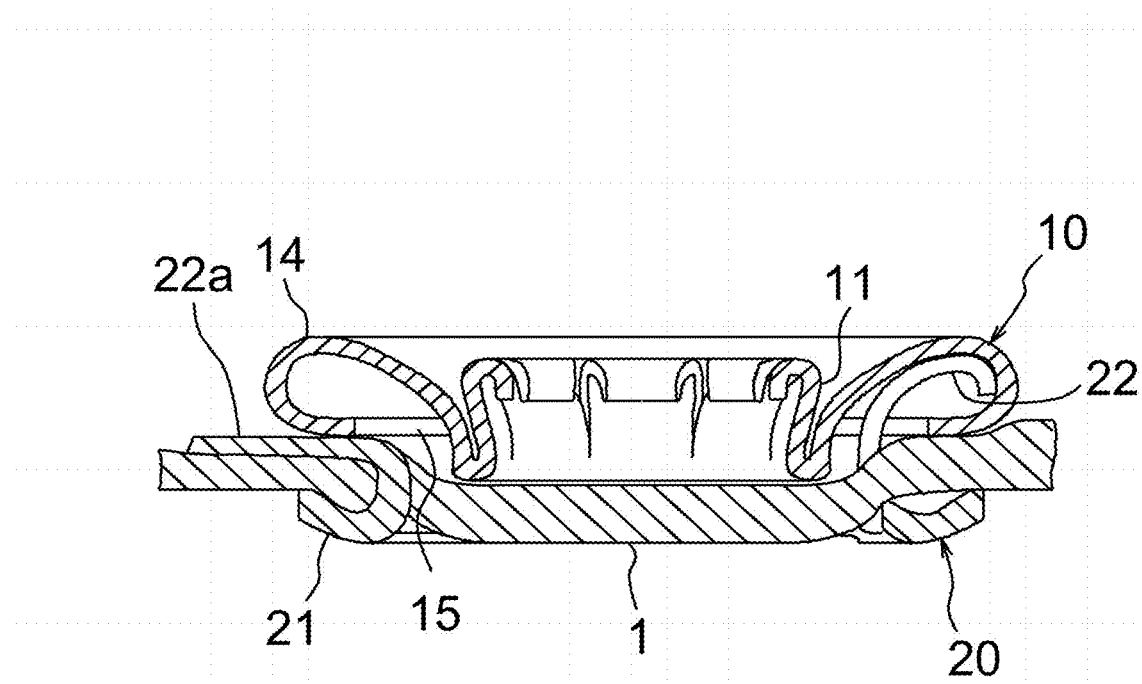
FIG. 4 is a cross-sectional view similar to FIG. 2 showing a state where the female snap has been attached to the fabric with the non-normal fastener shown in FIG. 3.

The transfer device 30 of the present invention is for transferring and supplying the fastener 20 one by one to the lower die 112 of the button attachment section 110. Although it will be described in detail later, the transfer device 30 includes a detection mechanism for detecting non-normal fastener 20 having at least one non-normal leg 22a (see FIG. 3) during the transferring of the fastener 20. When the detection mechanism detects the non-normal fastener 20, the supplying of the non-normal fastener 20 to the lower die 112 or the button attachment operation at the button attachment section 110 is temporarily stopped. The button attachment apparatus 100 includes a button member transferring device 120, above the button fastener transferring device 30, for transferring and supplying the female snap 10 to the upper die 111 in the button attachment section 110. The button attachment apparatus 100 comprises a first hopper (not shown) in which a large number of the female snaps 10 are accommodated, a second hopper (not shown) in which a large number of the fasteners 20 are accommodated, a first chute (not shown) for supplying the female snaps 20 one by one from the first hopper to the button member transferring device 120, and a second chute 121 for supplying the fasteners 20 one by one from the second hopper to the button fastener transferring device 30.

Figure 6:
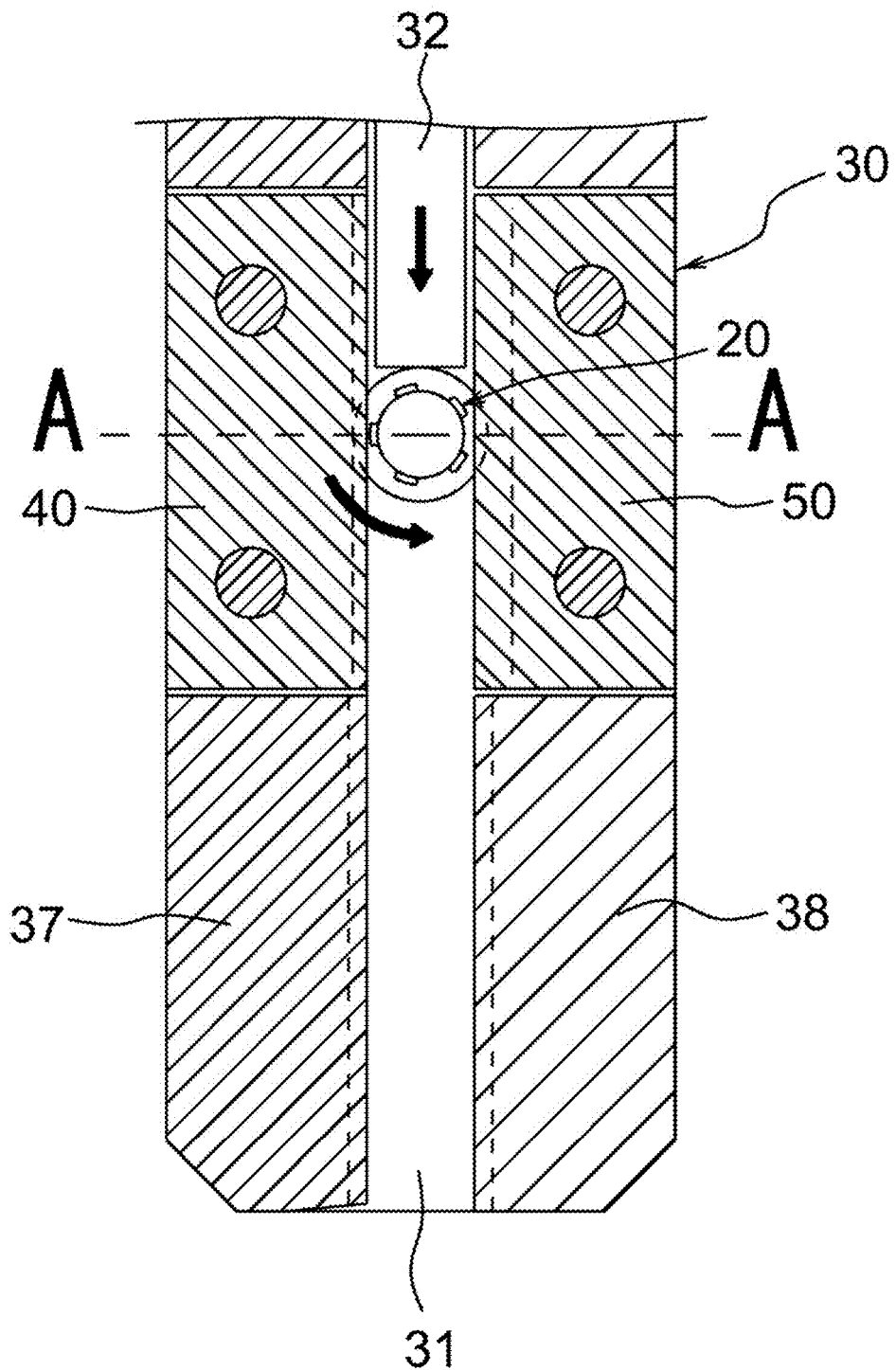
FIG. 6 is a top view of the button fastener transfer device according to the first embodiment of the present invention, in which the normal fastener is passing through the transfer path.
Figure 7:
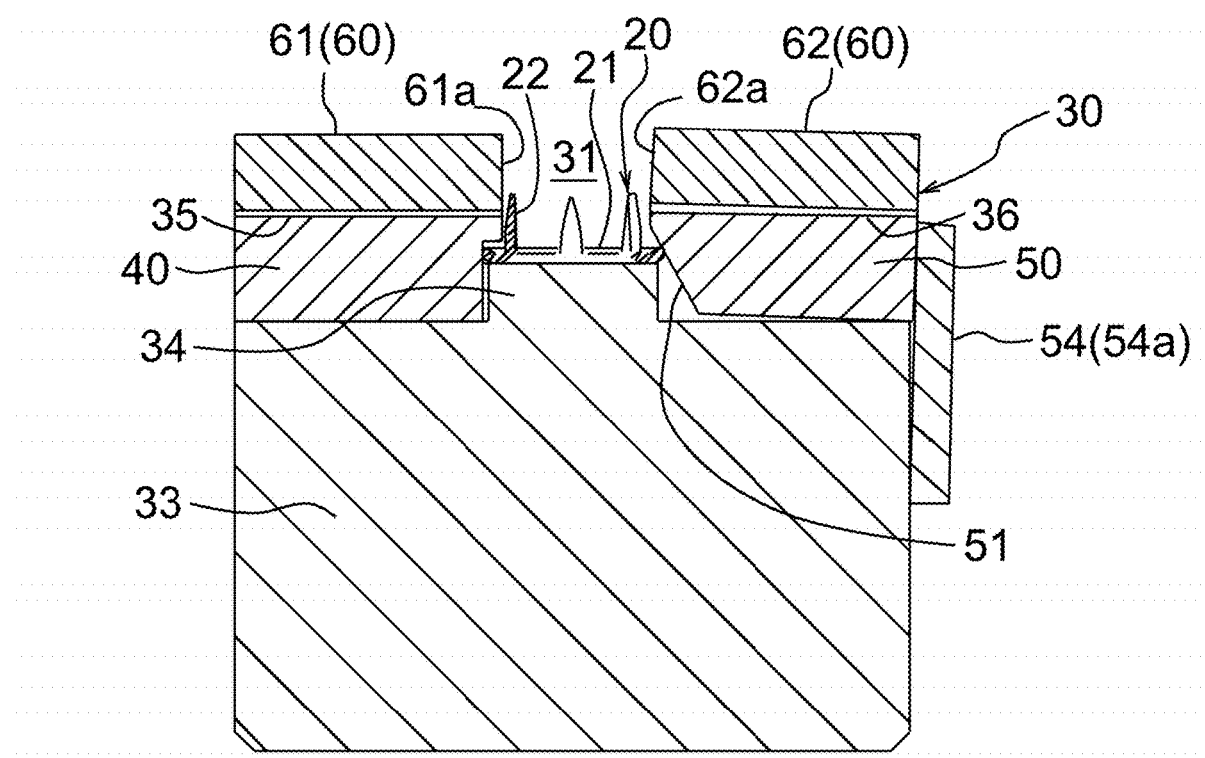
FIG. 7 is a cross-sectional view taken along the line A-A in FIG. 6.
Figure 8:
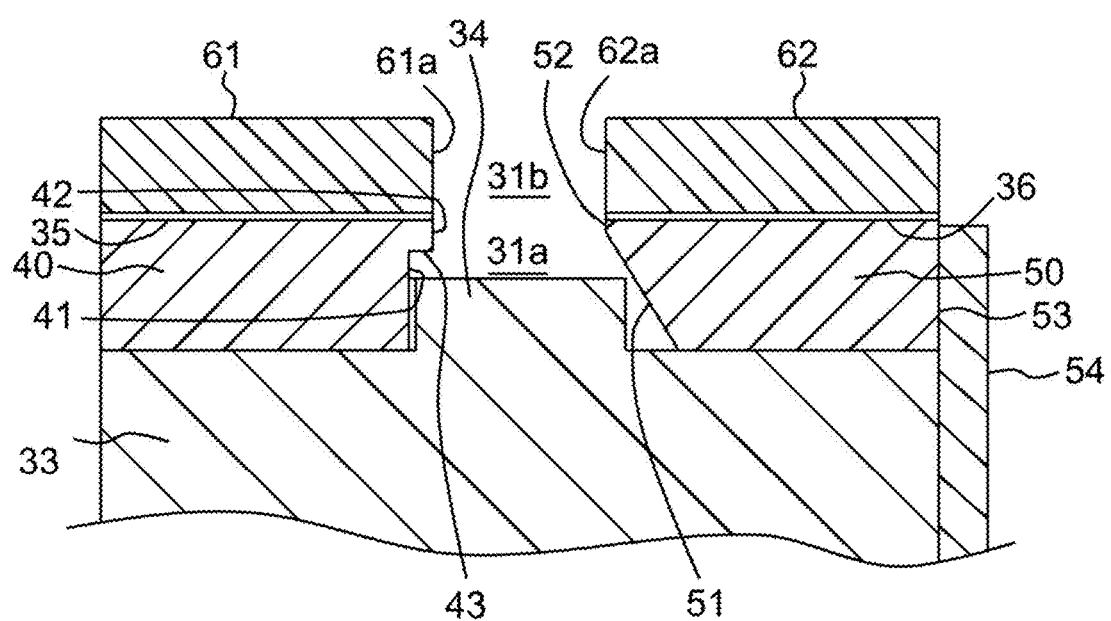
FIG. 8 is an enlarged sectional view of an essential part showing a state where no fastener exists in the transfer path.

FIG. 6 is a top view of the button fastener transfer device 30 according to the first embodiment of the present invention. In FIG. 6, a normal fastener 20 that does not have non-normal legs 22a is passing through a transfer path 31 as will be described later. FIG. 7 is a cross-sectional view taken along the line A-A in FIG. 6. FIG. 8 is an enlarged sectional view of an essential part showing a state where the fastener 20 is not present in the transfer path 31 (hereinafter referred to as "fastener absent state"). The transfer device 30 comprises the transfer path 31 for passing the fastener 20 downstream with the base 21 down; a pusher 32 (movable member) movable in the transfer path 31 for moving the fastener 20 downstream in the transfer path 31; a detection mechanism for detecting a non-normal fastener 20 as will be described later in detail. The detection mechanism is provided in the middle of the transfer path 31. Hereinafter, a part, in the upstream-downstream direction, of the transfer path 31 in which the detection mechanism is provided is referred to as a "transfer path detection part". The pusher 32 can move between an initial position on the upstream side in the transfer path 31 and a final position on the downstream side. The fastener 20 is supplied from the second hopper through the second chute 121 to a predetermined position on the upstream side in the transfer path 31 of the transfer device so as to place the base 21 down. The fastener 20 supplied to the predetermined position is pushed by the pusher 32 to be transferred to the downstream lower die 112 through the transfer path 31.

The transfer device 30 comprises a metallic base body 33; a left guide 40 disposed on the left side on the upper surface of the base body 33 (hereinafter, left-and-right direction and up-and-down direction as to the transfer device 30 are based on FIG. 7, etc.); a right guide 50 disposed on the right side on the upper surface of base body 33; left and right sheet-like insulators 35, 36 covering upper surfaces of the left and right guides 40, 50; a left conductive plate 61 disposed on the left insulator 35 on the left side on the upper surface of the base body 33; and a right conductive plate 62 disposed on the right insulator 36 on the right side on the upper surface of the base body 33. The left and right guides 40, 50 are made of metal and have conductivity. In this embodiment, the left and right conductive plates 61, 62 are at least one first conductive member in the claims, and the base body 33 and the left and right guides 40, 50 are at least one second conductive member in the claims. The left and right insulators 35, 36 insulate between the left and right conductive plates 61, 62 and the left and right guides 40, 50, and thereby the left and right conductive plates 61, 62 and the base body 33 are also isolated with the left and right insulators 35, 36. The transfer path detection part 31 (the same reference numeral as the transfer path 31 is used, for convenience) is the part, in the upstream-downstream direction, of the transfer path 31 in which the left and right guides 40, 50, the left and right conductive plates 61, 62, etc. are arranged. A bottom of the transfer path 31 is defined by a raised portion 34, as described later, of the base body 33. A left side of the transfer path detection part 31 is substantially defined by the left guide 40 and the left conductive plate 61. The right side of the transfer path detection part 31 is substantially defined by the right guide 50 and the right conductive plate 62. The transfer path 31 is open upward. The left and right side faces of the transfer path 31 other than the transfer path detection part 31 are defined by the left and right guide members 37, 38 (see FIG. 6). In this embodiment, the left and right conductive plates 61, 62 (especially, their respective side surfaces defining the left and right sides of the transfer path 31) serve as a detection part 60 capable of detecting a non-normal fastener 20. Further, a left inclined surface 51, as described later, of the right guide 50 serves as a rotation applying part 51 (the same reference numeral as the inclined surface 51 is used, for convenience) that doubles as a second peeling surface.

Figure 1:
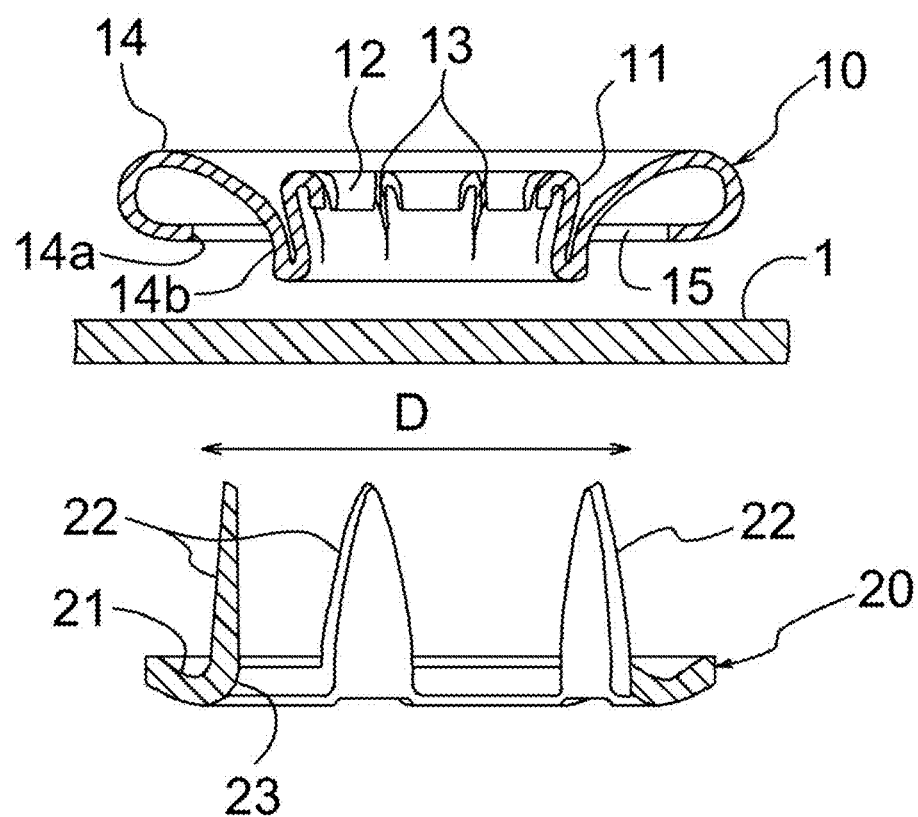
FIG. 1 is a cross-sectional view showing a female snap and a fastener immediately before they are attached to a fabric.

The transfer path 31 includes a lower first region 31*a* corresponding to the base 21 of the fastener 20 and an upper second region 31*b* corresponding to the legs 22. The left-and-right interval of the second region 31*b* is slightly larger than the diameter D (see FIG. 1) of a circle on which, as an example, the five legs 22 in one fastener 20 are circumferentially arranged, and is smaller than the left-and-right interval of the first region 31*a*. The base body 33 has a raised portion 34 raised on the upper surface at a left-and-right middle portion thereof, and the upper surface of the raised portion 34 defines the bottom of the transfer path 31. The left guide 40 is fixedly disposed on the upper surface leftward from the raised portion 34 of the base body 33. The left guide 40 includes a lower right surface 41 defining the left side of the first region 31*a* of the transfer path detection part 31, and an upper right surface 42, which protrudes rightward from the lower right surface 41 and defines the left side of the second region 31*b* of the transfer path detection part 31 together with a right surface 61*a* of the left conductive plate 61. The upper and lower right surfaces 42, 41 are vertical surfaces along the vertical direction. There is formed a step 43 between the lower right surface 41 and the upper right surface 42. The lateral length of the step 43, namely, the interval between the upper and the lower right surfaces 42, 41 in the left-and-right direction is equal to or slightly longer than the length between a one leg 22 in the fastener 20 and the radially outer end of the base 21 radially outward from the one leg 22. A portion, lower than the first region 31*a*, of the lower right surface 41 of the left guide 40 is in contact with or very close to the vertical left surface of the raised portion 34 of the base body 33. The right guide 50 is disposed on the upper surface, rightward from the raised portion 34, of the base body 33. The left surface of the right guide 50 includes an inclined surface 51, which is inclined so as to be closer to the left guide 40 upward from its lower end, and a vertical surface 52, which slightly extends vertically upward from the upper end of the inclined surface 51. With respect to the vertical right surface of the raised portion 34 of the base body 33, the lower end of the inclined surface 51 is located rightward in the left-and-right direction while the upper end of the inclined surface 51 is located leftward. Therefore, the inclined surface 51 extends in the vertical direction across the first region 31*a* and the second region 31*b* of the transfer path 31, and there is an almost triangular gap between the inclined surface 51 and the right surface of the raised portion 34 of the base body 33. The vertical surface 52 of the right guide 50 defines the right side of the second region 31*b* of the transfer path detection part 31 together with the vertical left surface 62*a* of the right conductive plate 62. The inclined surface 51 of the right guide 50 is roughened such as by processing fine irregularities, and its friction is enhanced. Thus, when the base 21 of the fastener 20 passing through the transfer path 31 comes into contact with the inclined surface 51, the base 21 or the fastener 20 is circumferentially rotated due to the friction with the inclined surface 51. At this time, the right guide 50 is displaced by the contact with the fastener 20. This way, in this embodiment, the inclined surface 51 of the right guide 50 serves as the rotation applying part 51 (the same reference numeral is used, for convenience). By rotating the fastener 20, when only one of the plurality of the legs 22 is the non-normal leg 22*a*, for example, it is possible to make the non-normal leg 22*a* contact one of the right surface 61*a* of the left conductive plate 61 and the left surface 62*a* of the right conductive plate 62 as the detection part 60. Therefore, the length in the upstream-downstream direction of the transfer path detection part 31 is set to be equal to or longer than the circumferential length of the base 21 of the fastener 20. In addition, the rotation applying part 51 with the roughened surface doubles as the second peeling surface 51 (the same reference numeral is used, for convenience) for partially peeling a coating of the base 21 by contacting the base 21 if the fastener 20 is coated with the coating or the like. The base 21 of the fastener 20 comes into contact with the base body 33 and the left or right guide 40, 50 as the second conductive member when passing through the transfer path detection part 31.

The right guide 50 has a right surface 53, which is a vertical surface, and the right surface 53 is flush with the right surface of the base body 33 in the fastener absent state (see FIG. 8). The right surface 53 of the right guide 50 is supported by a plate spring 54 as an elastic member. Referring to FIG. 5, the plate spring 54 comprises a plate spring main body 54*b*, one end of is fixed to the right surface 53 of the transfer device 30, and a spring base 54*a* to which the other end of the plate spring main body 54*b* is connected. The spring base 54*a* supports the right surface 53 of the right guide 50. The plate spring 54 biases the right guide 50 leftward so that the right guide 50 is at its initial position as shown in FIG. 8 in the fastener absent state before the right guide 50 is displaced. In this initial position, the lower surface of the right guide 50 is in contact with the upper surface of the base body 33 without any gap between them, and the right surface 53 of the right guide 50 is flush with the right surface of the base body 33 as mentioned above. In addition, the rotation applying part (inclined surface) 51 of the right guide 50 in the initial position is in contact with or very close to the corner between the upper surface and the right surface of the raised portion 34 of the base body 33. The left-and-right interval between the portion (base-corresponding portion) in the up-and-down direction in the rotation applying part (inclined surface) 51, which corresponds to (contacts) the base 21 of the fastener 20; and the lower right surface 41 of the left guide 40 is set to be slightly smaller than the diameter of the base 21 of the fastener 20. The left-and-right length of the upper surface of the raised portion 34 of the base body 33 is set to be equal to or slightly shorter than the diameter of the base 21 of the fastener 20. Therefore, when the fastener 20 passes through the transfer path detection part 31, the base 21 of the fastener 21 reliably contacts the base-corresponding portion in the rotation applying part 51 of the right guide 50, and this contact causes the right guide 50 to be slightly displaced rightward (see FIG. 7) from the initial position (see FIG. 8) against the bias of the plate spring 54. This rightward displacement of the right guide 50 may be translated rightward on the upper surface of the base body 33. Alternatively, the rightward displacement may be done by clockwise turning the right guide 50 around the corner between its lower surface and the right surface 53 (see FIGS. 7, 9 and 10). When the right guide 50 is displaced by the turning, a gap is generated between the lower surface of the right guide 50 and the upper surface of the base body 33, and the right surface 53 of the right guide 50 is slightly protruded rightward from the right surface of the base body 33. When the right guide 50 is slightly displaced rightward from the initial position by the base 21 of the fastener 20 contacting the rotation applying part 51, the right guide 50 receives a bias (return force) in the direction returning to the initial position by plate spring 54. Thereby, the right guide 50 pushes the fastener 20 against the upper and lower right surfaces 42, 41 of the left guide 50 via the contact with the base 21. In this way, it is possible to surely rotate the fastener 20 by reliably making the rotation applying part 51 of the right guide 50 contact the base 21 of the fastener 20. Friction in the fastener 20 is greater on the right end side of the base 21 that contacts the rotation applying part 51. In other words, so to speak, a brake is applied to the right end side of the base 21 of the fastener 20, so that the left end side of the base 21 rotates counterclockwise as viewed from above (see the arrow in FIG. 6) so as to go downstream ahead.

The right surface 61a of the left conductive plate 61 is a vertical surface flush with the upper right surface 42 of the left guide 40, and defines the left side of the second region 31b of the transfer path detection part 31 together with the upper right surface 42 as described above. The left surface 62a of the right conductive plate 62 defining an upper portion of the right side of the second region 31b is also a vertical surface. The right and left surfaces 61a, 62a of the left and right conductive plates 61, 62 face upper portions of the legs 22 of the fastener 20 passing through the transfer path detection part 31. The right and left surfaces 61a, 62a are arranged not to contact normal legs 22 of the fastener 20 but to surely contact non-normal legs 22a. Once a non-normal leg 22a of a non-normal fastener 20 contacts the right surface 61a of the left conductive plate 61 or the left surface 62a of the right conductive plate 62, an electric current flows, through the non-normal fastener 20 itself, between the left or right conductive plate 61, 62; and the base body 33 and the left or right guides 40, 50, which were in an electrically isolated state by the left and right insulators 35, 36 till then. Thereby, the non-normal fastener 20 is detected. There is a fastener 20 coated with a nonconductive coating or the like. To deal with such a fastener 20, the rotation applying part 51 of the right guide 50 serves as the second peeling surface 51 and the right surface 61a of the left conductive plate 61 and the left surface 62a of the right conductive plate 62 serve as the first peeling surfaces 61a, 62a (the same reference numerals are used, for convenience) as follows. That is, there are processed fine irregularities or the like on the first peeling surfaces 61a, 62a in order to partially peel a coating or a painting of a non-normal leg 22a of the fastener 20 contacting the first peeling surfaces 61a, 62a if the fastener 20 is coated with the coating or painting. When a non-normal fastener 20 passes through the transfer path detection part 31, its non-normal leg(s) 22a surely contacts the first peeling surface 61a or 61b of the left or right conductive plate 61 or 62 as the first conductive member. In this case, the coating of the non-normal leg(s) 22a of the non-normal fastener 20 is partially peeled off by contacting the first peeling surface 61a or 62a of the left or right conductive plate 61, 62. At the same time, the coating of the base 21 of the non-normal fastener 20 is partially peeled off by contacting the second peeling surface 51 of the right guide 50. Therefore, an electric current flows between at least one of the left and right conductive plates 61, 62; and the right guide 50 and the base body 33 via the non-normal fastener 20, and thereby the non-normal fastener 20 is detected. In addition, there is a case where an electric current flows between the left or right conductive plate 61 or 62 and the left guide 40, since the right guide 50 pushes the non-normal fastener 20 leftward and its base 21 on which the coating has been partially peeled off contacts the left guide 40. As described above, in this embodiment, the left and right conductive plates 61, 62 connected to the anode side (or cathode side) of a power supply (not shown), the left and right guides 40, 50 and the base body 33 connected to the cathode side (or anode side), and the non-normal fastener 20 electrically connecting between them constitute the energization mechanism. Further, in this embodiment, the base body 33, the left guide 40, the right guide 50 including the rotation applying part 51, the left and right conductive plates 61, 62 as the detection part 60, etc. constitute the detection mechanism.

Figure 9:
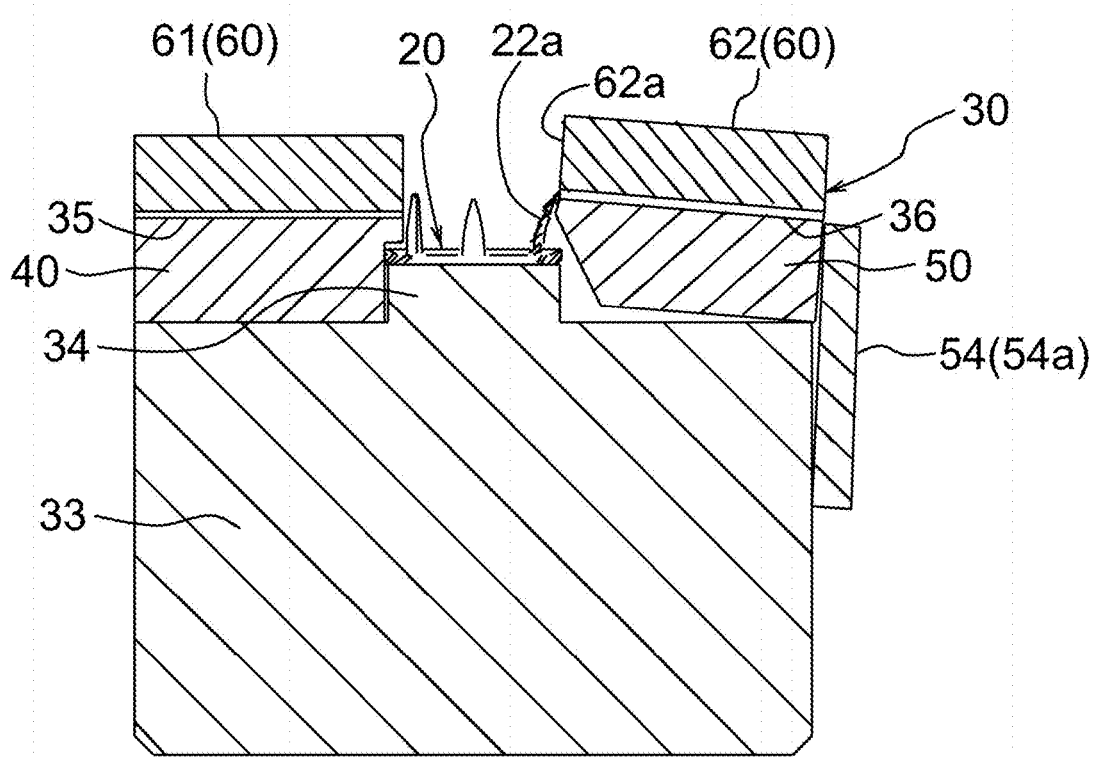
FIG. 9 is a cross-sectional view similar to FIG. 7 showing a state where a non-normal leg of the non-normal fastener is in contact with a right conductive plate.
Figure 10:
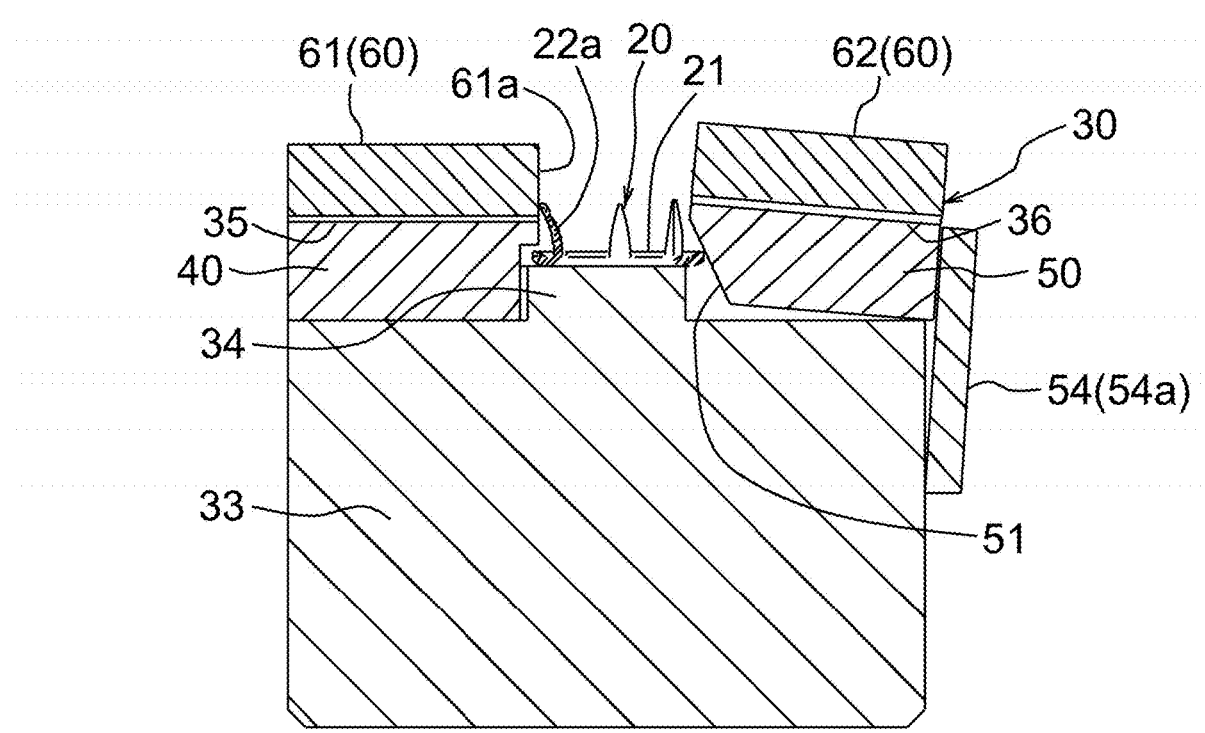
FIG. 10 is a cross-sectional view similar to FIG. 7 showing a state where a non-normal leg of the non-normal fastener is in contact with a left conductive plate.

When the normal fastener 20 passes through the transfer path detection part 31 in the button fastener transfer device 30, the base 21 of the fastener 20 contacts the rotation applying part 51 of the right guide 50, and thereby the fastener 20 is rotated. In this case, however, the normal legs 22 of the fastener 20 do not contact the right and left surfaces 61a, 62a of the left and right conductive plates 61, 62 as the detection part 60. Therefore, no electric current flows between the left or right conductive plate 61, 62 and the base body 33. When the base 21 of the fastener 20 contacts the rotation applying part 51 of the right guide 50, the right guide 50 is slightly displaced from the initial position in the direction (rightward in FIG. 7) away from the left guide 40 against the bias of the plate spring 54 as shown in FIG. 7. On the other hand, in a case where the non-normal fastener 20 having one or more non-normal legs 22a passes through the transfer path detection part 31, when the non-normal fastener 20 rotates by contacting the rotation applying part 51, the non-normal leg(s) 22a comes into contact with at least one of the right and left surfaces 61a, 62a of the left and right conductive plates 61, 62. Thereby, an electric current flows between the left or right conductive plates 61 or 62 and the base body 33 through the non-normal fastener 20. Thereby, the non-normal fastener 20 is detected and its transfer is stopped. FIG. 9 shows a state at which a non-normal leg 22a of the non-normal fastener 20 contacts the left surface 62a of the right conductive plate 62 as the detection part 60. In this case, since the non-normal leg 22a contacts the left surface 62a of the right conductive plate 62, the right guide 50 is obliquely displaced upward and rightward from the initial position against the bias of the plate spring 54. FIG. 10 shows a state at which the non-normal leg 22a of the non-normal fastener 20 contacts the right surface 61a of the left conductive plate 61 as the detection part 60. In this case, since the non-normal leg 22a contacts the right surface 61a of the left conductive plate 61, the non-normal fastener 20 is displaced on the raised portion 34 in the direction closer to the plate spring 54 (rightward in FIG. 10). Thus, the base 21 of the non-normal fastener 20 pushes the rotation applying part (inclined surface) 51 of the right guide 50 rightward. Thereby, the right guide 50 is obliquely displaced upward and rightward from the initial position against the bias of the plate spring 54. In a case that the non-normal fastener 20 is coated with a nonconductive coating or the like, when the non-normal leg(s) 22a contacts the first peeling surface 61a or 62a, namely, the right or left surface 61a or 62a of the left or right conductive plate 61 or 62 as shown in FIGS. 9 and 10, the coating on the non-normal leg(s) 22a is partially peeled off. At the same time, the coating on the base 21 is partially peeled off by the second peeling surface 51 of the right guide 50. Thereby, an electric current flows between the left or right conductive plates 61 or 62 and the right guide 50 and the base body 33 via the non-normal fastener 20.

Figure 11:
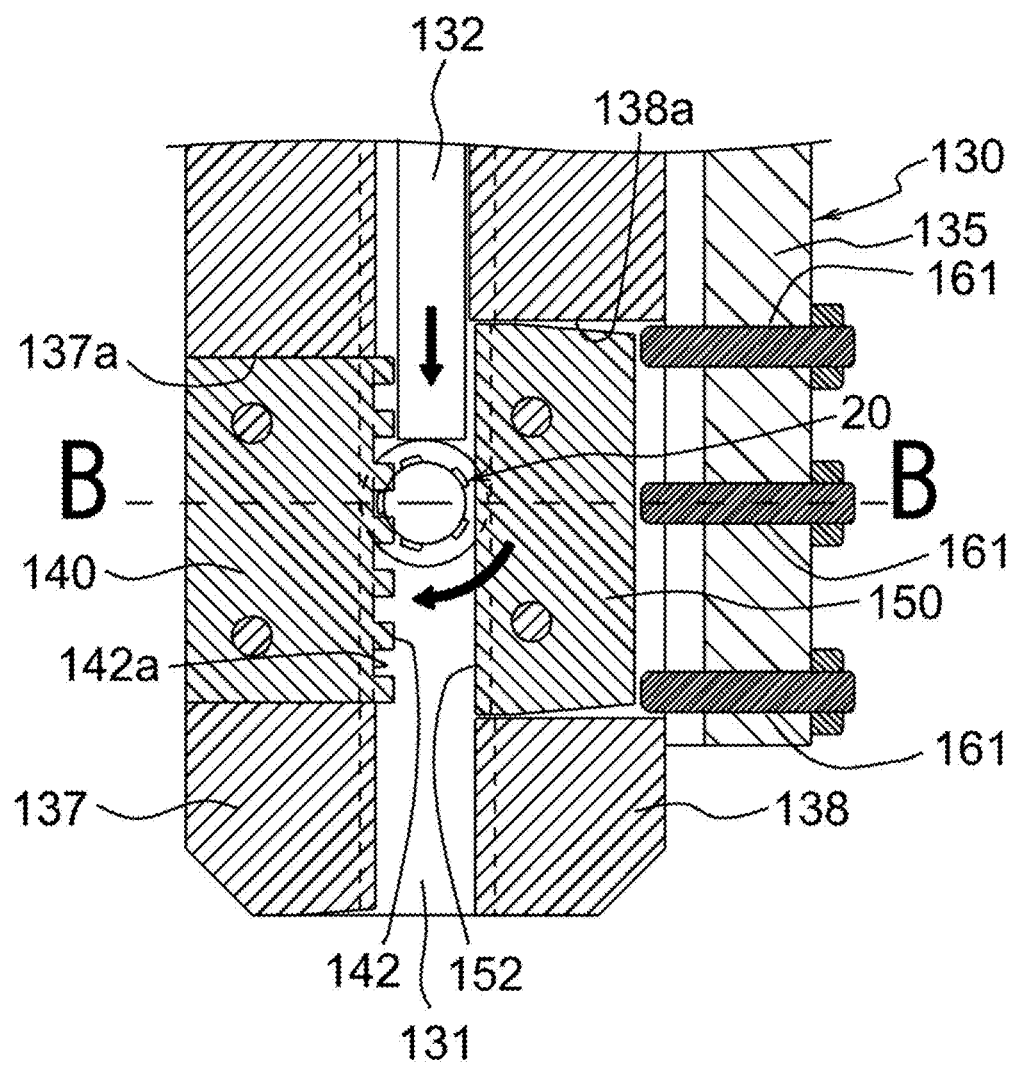
FIG. 11 is a top view of the button fastener transfer device according to the second embodiment of the present invention.
Figure 12:
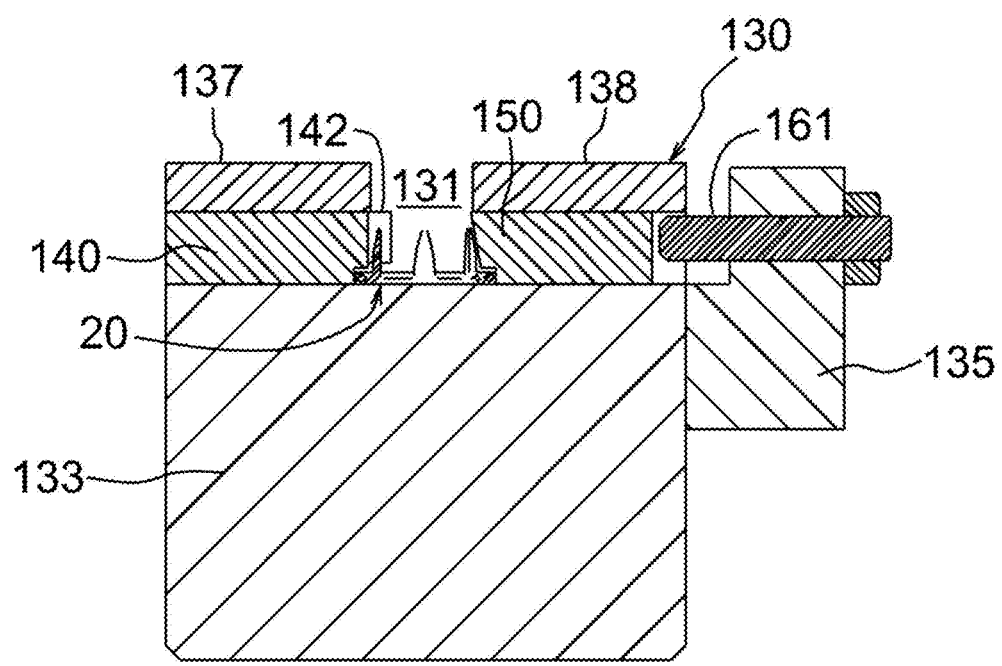
FIG. 12 is a cross-sectional view taken along the line B-B in FIG. 11.
Figure 13:
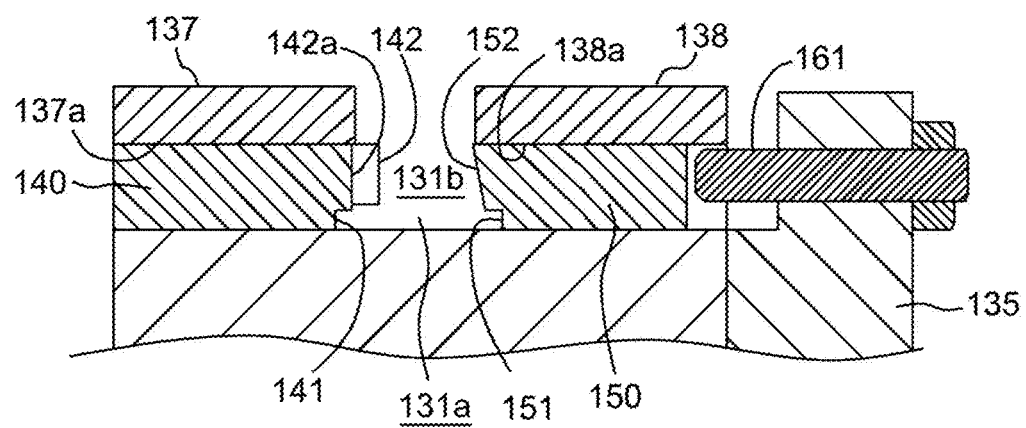
FIG. 13 is an enlarged sectional view of an essential part showing a state where no fastener exists in the transfer path.

FIG. 11 is a top view of a button fastener transfer device 130 according to a second embodiment of the present invention, which can be incorporated into the button attachment apparatus 100. In FIG. 11, the normal fastener 20 is passing through a transfer path 131 as described later. FIG. 12 is a cross-sectional view taken along the line B-B in FIG. 11. FIG. 13. is an enlarged sectional view of an essential part showing a state where the fastener 20 is not present in the transfer path 131. The transfer device 130 comprises the transfer path 131 for passing the fastener 20 and a pusher 132 (movable member) for moving the fastener 20 to the lower die 112 of the button attachment section 110 downstream in the transfer path 131, and a detection mechanism described in detail below for detecting a non-normal fastener 20.

The transfer device 130 comprises a metallic base body 133 as a second conductive member, a left guide body 137 fixedly disposed leftward on the upper surface of the base body 133, and a right guide body 138 fixedly disposed rightward on the upper surface of the base body 133. The left guide body 137 is provided with a rectangular, plate-shaped left space 137a, which is recessed upward from the lower surface of the left guide body 137 in a part in the upstream-downstream direction and is open leftward and rightward. A left guide 140 is fixedly fitted into the left space 137a. The right guide body 138 is also provided with a rectangular plate-shaped right space 138a in a part substantially corresponding to the left space 137a in the upstream-downstream direction. A metallic right guide 150 is housed in the right space 138a slightly displaceable in the left-and -right direction. On the right surface of the left guide 140, a rotation applying part 142 is provided as described later. On the right side of the right guide 150, three metal pin members 161 as an example of a first conductive member are disposed equally spaced in the upstream-downstream direction. The axis of each of the pin members 161 is along the left-and-right direction. The pin members 161 are supported by an insulating member 135 that extends in the upstream-downstream direction. The right guide 150 is biased by a spring as an elastic member (not shown) to a leftmost, initial position as shown in FIG. 13 before the right guide 150 is displaced. In this initial position, the left end of each of the pin members 161 is slightly spaced from the right surface of the right guide 150. Therefore, the pin members 161 and the base body 133 are electrically isolated by the insulating member 135 fixed to the base body 133. In the upstream-downstream direction of the transfer path 131, the part in which the left and right guides 140, 150 are arranged is the transfer path detection part 131 (the same reference numeral is used, for convenience). Though described later in detail, if a non-normal fastener 20 having one or more non-normal leg(s) 22a passes through the transfer path detection part 131, the right guide 150 will be displaced against the bias of the spring toward the pin members 161 (rightward in FIG. 13) from the initial position. Thereby, the right guide 150 contacts at least one of the three pin members 161. At this time, an electric current flows temporarily between the pin member(s) 161 and the base body 133 via the conductive right guide 150. Thereby, the transfer of the non-normal fastener 20 is stopped. As described above, in this embodiment, the right guide 150 is the detection part 150 (the same reference numerals are used for convenience), and the pin members 161 connected to the anode side (or the cathode side) of a power supply (not shown), the base body 133 connected to the cathode side (or the anode side) of the power supply and the right guide (detection part) 150 constitute the energization mechanism.

The bottom of the transfer path 131 is defined by the top surface of the base body 133. The transfer path 131 includes a lower first region 131a corresponding to the base 21 of the fastener 20 and an upper second region 131b corresponding to the legs 22. The left-and-right distance of the second region 131b is slightly larger than the diameter D (see FIG. 1) made by the five legs 22 of the fastener 20 and smaller than the left-and-right distance of the first region 131a. The left and right surfaces of the transfer path 131 other than the transfer path detection part 131 are defined by the right and left surfaces of the left and right guide bodies 137, 138. The thickness of each of the left and right guides 140, 150 is set to be larger than the height of the fastener 20 on the transfer path 131. The left and right surfaces of the transfer path detection part 131 are substantially defined by the left and right guides 140, 150. The transfer path 131 is open upward. The left guide 140 has a lower right surface 141 defining the left side of the first region 131a of the transfer path detection part 131 and a rotation applying part 142, which projects rightward more than the lower right surface 141 and makes the left side of the second region 131b of the transfer path detection part 131. The right guide 150 has a lower left surface 151 defining the right side of the first region 131a of the transfer path detection part 131 and an upper left surface 152, which projects leftward from the lower left surface 151 and defines the right side of the second region 131b of the transfer path detection part 131. The upper left surface 152 is an inclined surface slightly protruding leftward from the lower end to the upper end.

The rotation applying part 142 has a groove surface in which a plurality of vertical grooves 142a each being recessed leftward and extending in the up-and-down direction are provided at predetermined intervals in the upstream-downstream direction. Each of the vertical grooves 142a is set to be a size that can receive one leg 22 of the fastener 120. Further, the interval (predetermined interval) between two vertical grooves 142a adjacent in the upstream-downstream direction in the rotation applying part 142 is set to be the same as the circumferential interval between two legs 22 adjacent in the circumferential direction of the base 21 in the fastener 20. Thereby, the plurality of the legs 22 of the fastener 20 move downstream while rotating and fitting in the vertical grooves 142a of the rotation applying part 142 one after another. In order to rotate the fastener 20 at least once, the number of the vertical grooves 142a of the rotation applying part 142 is five or more in this embodiment. Each of the vertical grooves 142a may have any shape that can rotate the fastener 20. For example, it is possible to form the vertical groove 142a in a shape that can receive two or more legs 22 of the fastener 20.

Figure 14:
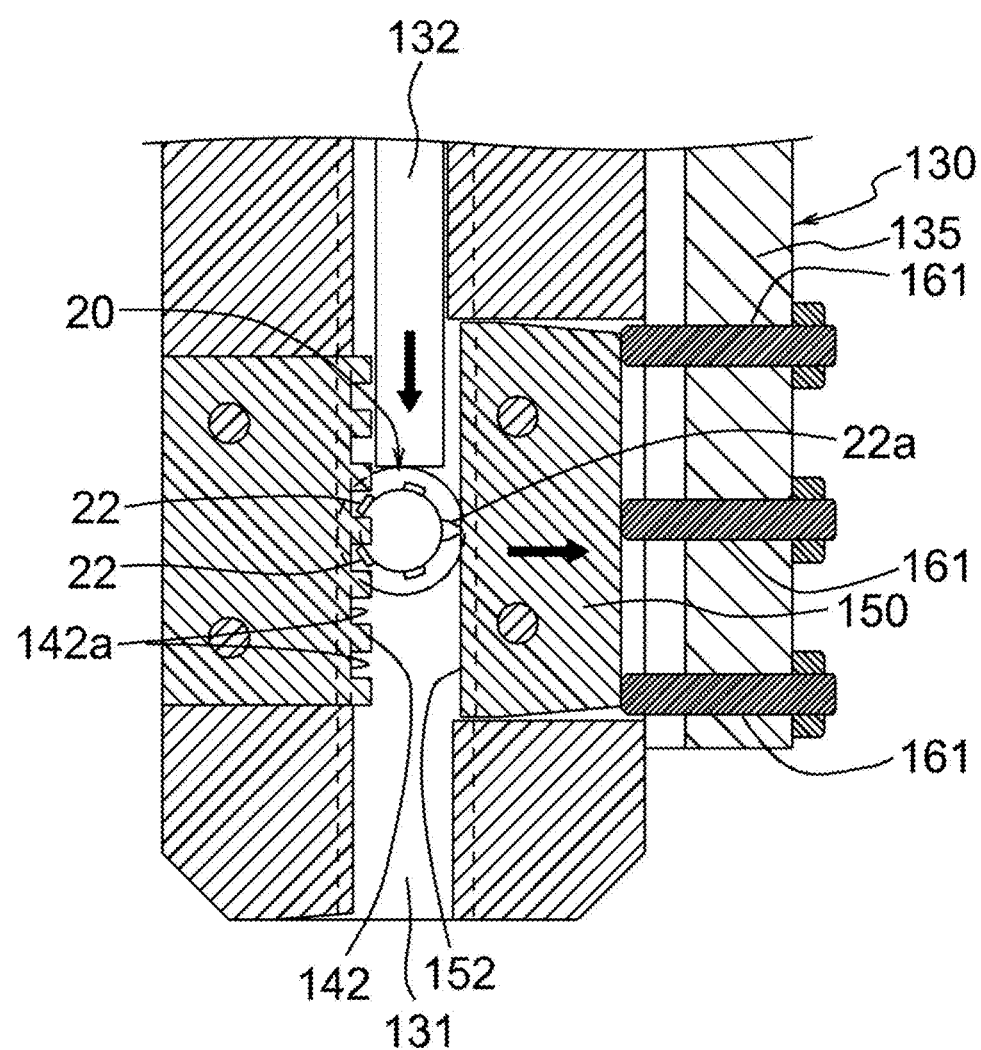
FIG. 14 is a top view showing a state where a non-normal leg is in contact with a right guide as a detection part.
Figure 15:
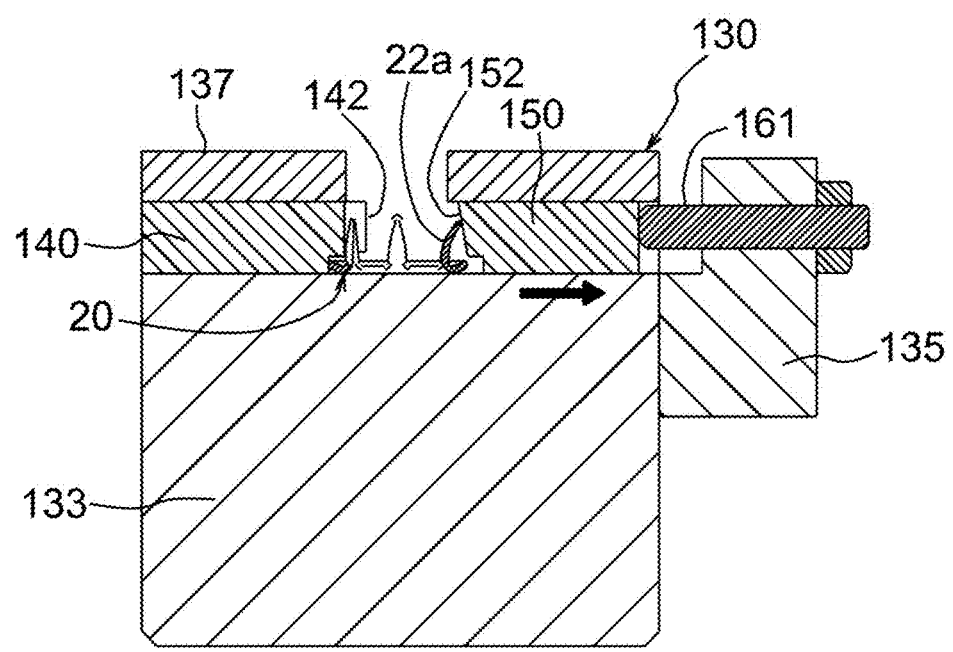
FIG. 15 is a cross-sectional view similar to FIG. 12, corresponding to FIG. 14.
Figure 16:
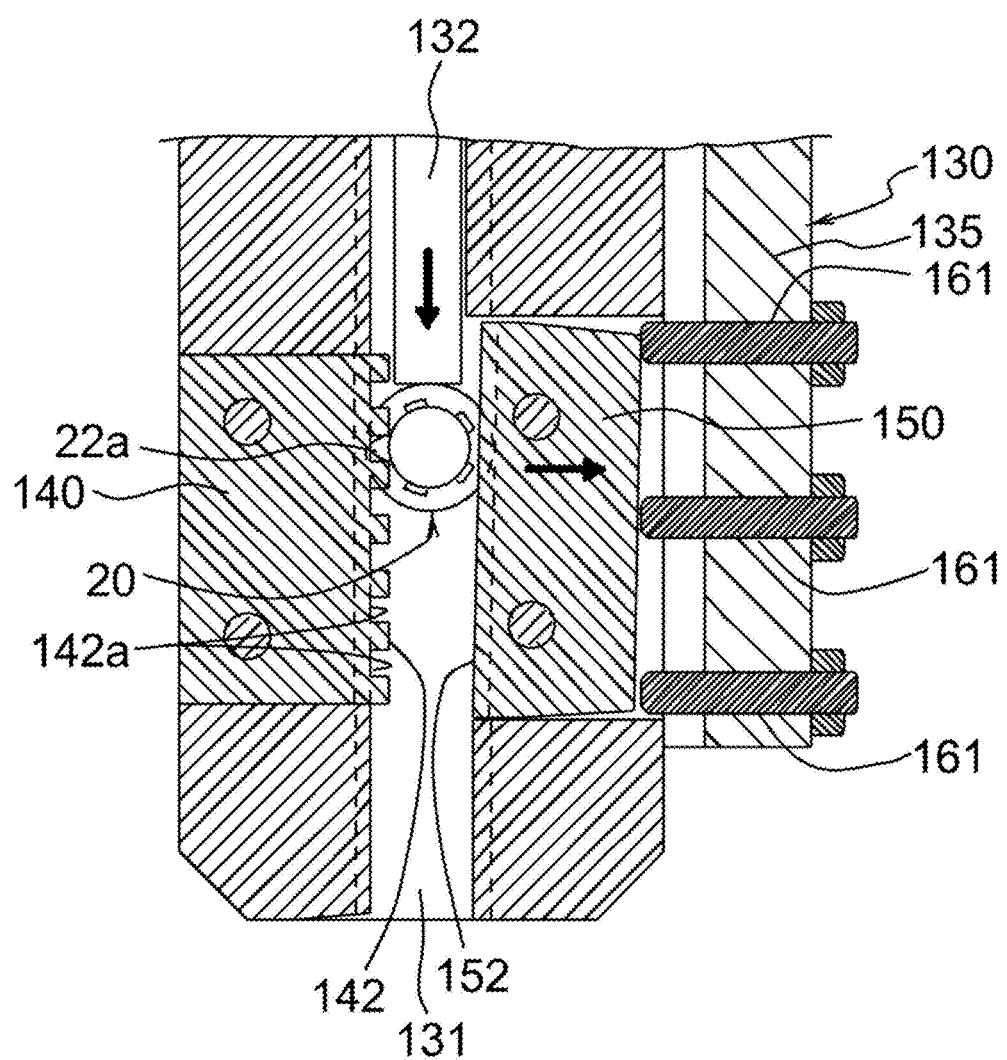
FIG. 16 is a top view showing a state where a non-normal leg comes in a vertical groove of the rotation applying part of the left guide.
Figure 17:
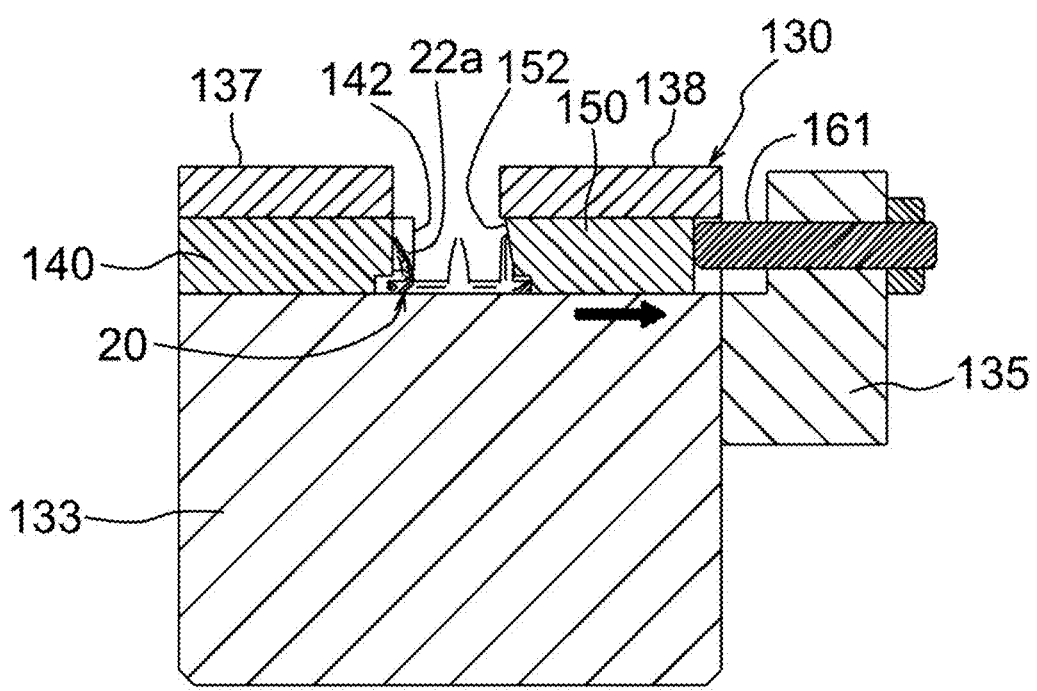
FIG. 17 is a cross-sectional view similar to FIG. 12, corresponding to FIG. 16.

In the button fastener transfer device 130, when the normal fastener 20 passes through the transport path detection part 131, the normal fastener 20 moves downstream while rotating in the clockwise direction (see the arrow in FIG. 11) seen from above by legs 22 of the normal fastener 20 coming in vertical grooves 141a of the rotation applying part 141. At this time, since the right guide 150 remains at the initial position, or even if the right guide 150 slightly moves rightward from the initial position, the right surface of the right guide 150 does not contact the pin members 161. FIGS. 14 and 15 are respectively a top view and a cross-sectional view showing a state wherein a non-normal leg 22a is in contact with the right guide 150 as the detection part. FIGS. 16 and 17 are respectively a top view and a cross-sectional view showing a state wherein a non-normal leg 22a is coming in a vertical groove 142a of the rotation applying part 142 of the left guide 140. When the non-normal fastener 20 having one or more non-normal legs 22a passes through the transfer path detection part 131, the non-normal leg(s) 22a directly contacts the upper left surface 152 of the right guide 150 and then pushes the right guide 150 rightward from the initial position (see FIG. 15); or the non-normal leg(s) 22a comes in the vertical groove(s) 142a of the rotation applying part 142 of the left guide 140 and thereby the non-normal fastener 20 is displaced rightward pushing the right guide 150 rightward from the initial position (see FIG. 17). Thereby, the right surface of the right guide 150 contacts one or more pin members 161, and therefore an electric current flows between the pin member(s) 161 and the base body 133 via the right guide 150. Referring to FIG. 11, etc., the right guide 150 is spaced from upstream and downstream sides defining the right space 138a of the right guide body 138 so as to be easily displaced in the right space 138a. Thereby, for example, as shown in FIG. 16, if the non-normal fastener 20 is detected relatively upstream in the transfer path detection part 131, only the most upstream pin member 161 may contact the right guide 150. Further, as shown in FIG. 14, if the non-normal fastener 20 is detected at the middle in the upstream-downstream direction in the transfer path detection part 131, all of the three pin members 161 may contact the right guide 150.

DESCRIPTION OF REFERENCE NUMERALS 1 fabric
10 female snap (button member)
20 fastener
21 base
22 leg
22a non-normal leg
30 button fastener transfer device
31, 131 transfer path (transfer path detection part)
31a, 131a first region
31b, 131b second region
32, 132 pusher (movable member)
33, 133 base body (second conductive member)
34 raised portion of base body
35 left insulator
36 right insulator
40 left guide (second conductive member)
50 right guide (second conductive member)
51 rotation applying part (second peeling surface, inclined surface of right guide)
54 plate spring
60 detection part
61 left conductive plate (first conductive member)
61a right surface of left conductive plate (first peeling surface)
62 right conductive plate (first conductive member)
62a right surface of right conductive plate (first peeling surface)
100 button attachment apparatus
110 button attachment section
111 upper die
112 lower die
135 insulating member
140 left guide
142 rotation applying part
142a vertical groove
150 right guide (detection part)
161 pin member (first conductive member)

What is claimed is:

1. A button fastener transfer device for transferring a metallic fastener to a button attachment section, in which a button member is to be attached to a fabric with the fastener, the fastener comprising an annular base and a plurality of legs, which extend from the base and are spaced apart in the circumferential direction of the base, the device comprising:
   a transfer path for passing the fastener with the base down;
   a movable member movable in the transfer path for moving the fastener downstream in the transfer path;
   a rotation applying part capable of contacting the fastener moving in the transfer path and configured to rotate the fastener in the circumferential direction of the base;
   at least one first conductive member and at least one second conductive member, which are normally electrically isolated from each other;
   a detection part configured to detect a non-normal fastener having at least one non-normal leg bent radially outward non-normally; and
   an energization mechanism configured to cause an electric current to flow between the first conductive member and the second conductive member if the detection part detects the non-normal fastener.

2. The button fastener transfer device according to claim 1, wherein the at least one first conductive member includes the detection part, and the at least one second conductive member defines a bottom of the transfer path,
   wherein the detection part is allowed to contact the non-normal leg of the fastener but not to contact normal legs, and
   wherein the energization mechanism passes an electric current between the first conductive member and the second conductive member through the non-normal fastener.

3. The button fastener transfer device according to claim 1, wherein the at least one second conductive member includes the rotation applying part,
   wherein the detection part includes a first peeling surface for partially peeling a coating of the non-normal leg of the non-normal fastener when the non-normal fastener is coated, and
   wherein the rotation applying part serves as a second peeling surface for partially peeling a coating of the base of the non-normal fastener.

4. The button fastener transfer device according to claim 1, wherein the rotation applying part is provided on a left side or a right side of the transfer path, and rotates the fastener by friction with the base of the fastener.

5. The button fastener transfer device according to claim 4, wherein the rotation applying part is biased by an elastic member toward the right side or the left side of the transfer path that the rotation applying part faces.

6. The button fastener transfer device according to claim 1, wherein the detection part is allowed to be displaced by contact with the non-normal fastener and is allowed to contact the first conductive member in the displaced state,
   wherein the detection part is conductive,
   wherein the energization mechanism causes an electric current to flow between the first conductive member and the second conductive member via the detection part.

7. The button fastener transfer device according to claim 6, wherein the second conductive member is a base body defining a bottom of the transfer path, and the detection part is displaceably placed on the base body.

8. The button fastener transfer device according to claim 6, wherein the rotation applying part is provided on a left side or a right side of the transfer path, and has a grooved surface in which a plurality of vertical grooves are arranged at predetermined intervals from the upstream side to the downstream side in the transfer path, and wherein the rotation applying part is configured to rotate the fastener by receiving at least one of the legs of the fastener in at least one of the grooves.

9. The button fastener transfer device according to claim 8, wherein the detection part defines a part of the right side or the left side of the transfer path that is opposite to the rotation applying part, and wherein the detection part is biased by an elastic member to an initial position which is closest to the rotation applying part, and is allowed to be displaced so as to move away from the rotation applying part from the initial position against the bias of the elastic member by contact with the non-normal fastener.

* * * * *